United States Patent
Kuppler et al.

(10) Patent No.: US 9,938,189 B2
(45) Date of Patent: Apr. 10, 2018

(54) PERVIOUS COMPOSITE MATERIALS, METHODS OF PRODUCTION AND USES THEREOF

(71) Applicants: John Kuppler, Green Brook, NJ (US); Devin Patten, Red Bank, NJ (US); Deepak Ravikumar, Piscataway, NJ (US); Omkar Deo, Piscataway, NJ (US); Vahit Atakan, West Windsor, NJ (US)

(72) Inventors: John Kuppler, Green Brook, NJ (US); Devin Patten, Red Bank, NJ (US); Deepak Ravikumar, Piscataway, NJ (US); Omkar Deo, Piscataway, NJ (US); Vahit Atakan, West Windsor, NJ (US)

(73) Assignee: Solidia Technologies, Inc., Piscataway, NJ (US)

(*) Notice: Subject to any disclaimer, the term of this patent is extended or adjusted under 35 U.S.C. 154(b) by 266 days.

(21) Appl. No.: 14/295,601

(22) Filed: Jun. 4, 2014

(65) Prior Publication Data
US 2014/0363665 A1    Dec. 11, 2014

Related U.S. Application Data

(60) Provisional application No. 61/832,242, filed on Jun. 7, 2013.

(51) Int. Cl.
*C04B 28/24* (2006.01)
*C04B 20/12* (2006.01)
(Continued)

(52) U.S. Cl.
CPC .............. *C04B 20/12* (2013.01); *B28B 11/24* (2013.01); *C04B 38/0038* (2013.01);
(Continued)

(58) Field of Classification Search
CPC ....... C04B 2111/00284; C04B 40/0231; C04B 38/0058; C04B 38/0067;
(Continued)

(56) References Cited

U.S. PATENT DOCUMENTS 3,646,643 A * 3/1972 Godin .................. B28B 11/145
198/608
4,436,498 A    3/1984 Murray
(Continued)

FOREIGN PATENT DOCUMENTS

WO    2009/103885 A2    8/2009
WO    2009/102360 A2    1/2010
(Continued)

OTHER PUBLICATIONS

Aoki, Y.; "Development of Pervious Concrete", "Chapter 2 Literature Review" Master's Thesis submitted to the University of Technology, Sydney, 2009, p. 5-39.*
(Continued)

*Primary Examiner* — Mark Ruthkosky
*Assistant Examiner* — Julia L Rummel
(74) *Attorney, Agent, or Firm* — Milstein Zhang & Wu LLC

(57) ABSTRACT

The invention provides novel pervious composite materials that possess excellent physical and performance characteristics of conventional pervious concretes, and methods of production and uses thereof. These composite materials can be readily produced from widely available, low cost raw materials by a process suitable for large-scale production with improved energy consumption, desirable carbon footprint and minimal environmental impact.

21 Claims, 20 Drawing Sheets

(51) Int. Cl.
*B28B 11/24* (2006.01)
*C04B 40/02* (2006.01)
*C04B 38/00* (2006.01)
*C04B 103/00* (2006.01)
*C04B 111/00* (2006.01)

(52) U.S. Cl.
CPC ...... *C04B 40/0231* (2013.01); *C04B 38/0058* (2013.01); *C04B 38/0067* (2013.01); *C04B 2103/0067* (2013.01); *C04B 2111/00284* (2013.01); *Y02P 40/18* (2015.11); *Y10T 428/249953* (2015.04); *Y10T 428/249975* (2015.04); *Y10T 428/249986* (2015.04); *Y10T 428/268* (2015.01)

(58) Field of Classification Search
CPC . Y10T 428/249986; Y10T 428/249953; Y10T 428/249975
See application file for complete search history.

(56) References Cited

U.S. PATENT DOCUMENTS

| | | | |
|---|---|---|---|
| 4,956,321 | A | 9/1990 | Barrall |
| 8,114,367 | B2 | 2/2012 | Riman et al. |
| 2005/0284339 | A1 | 12/2005 | Brunton et al. |
| 2007/0062416 | A1 | 3/2007 | Brzuskiewicz et al. |
| 2008/0156225 | A1* | 7/2008 | Bury ............... C04B 28/02 106/14.05 |
| 2009/0133361 | A1 | 5/2009 | Vera |
| 2009/0142578 | A1 | 6/2009 | Riman et al. |
| 2009/0143211 | A1 | 6/2009 | Riman et al. |
| 2010/0077691 | A1 | 4/2010 | Constantz et al. |
| 2010/0326328 | A1 | 12/2010 | Constantz et al. |
| 2011/0067600 | A1 | 3/2011 | Constantz et al. |
| 2011/0067605 | A1 | 3/2011 | Constantz et al. |
| 2011/0104469 | A1 | 5/2011 | Riman et al. |
| 2011/0129407 | A1 | 6/2011 | Riman et al. |
| 2011/0182799 | A1 | 7/2011 | Riman et al. |
| 2011/0203489 | A1 | 8/2011 | Constantz et al. |
| 2011/0230598 | A1* | 9/2011 | Sorger ............... E01C 11/226 524/5 |
| 2011/0290156 | A1 | 12/2011 | Constantz et al. |
| 2012/0312194 | A1 | 12/2012 | Riman et al. |
| 2013/0122267 | A1* | 5/2013 | Riman ............... C04B 14/043 428/201 |
| 2014/0127450 | A1 | 5/2014 | Riman et al. |
| 2014/0127458 | A1 | 5/2014 | Riman et al. |
| 2014/0342124 | A1 | 11/2014 | Zambrzycki et al. |

FOREIGN PATENT DOCUMENTS

| | | |
|---|---|---|
| WO | 2011/053598 A2 | 5/2011 |
| WO | 2011/090967 A2 | 7/2011 |
| WO | 2012/122031 A2 | 9/2012 |
| WO | 2014/159832 A2 | 10/2014 |
| WO | 2014/160168 A2 | 10/2014 |
| WO | 2014/165252 A2 | 10/2014 |
| WO | 2014/165257 A2 | 10/2014 |
| WO | 2014/197532 A2 | 12/2014 |
| WO | 2014/197545 A2 | 12/2014 |
| WO | 2015/051243 A2 | 4/2015 |

OTHER PUBLICATIONS

Tennis, P.; Leming, M.; Akers, D.; "Pervious Concrete Pavements", Portland Cement Association, 2004, p. 1-32.*
PCT/US2014/024987, Int'l Search Report of ISA, dated Aug. 14, 2014.
PCT/US2014/025278, Int'l Search Report of ISA, dated Aug. 14, 2014.
PCT/US2014/024996, Int'l Search Report of ISA, dated Aug. 21, 2014.
PCT/US2014/025958, Int'l Search Report of ISA, dated Sep. 4, 2014.
PCT/US2014/040816, Int'l Search Report of ISA, dated Oct. 30, 2014.
PCT/US2014/040789, Int'l Search Report of ISA, dated Sep. 30, 2014.
PCT/US2014/059024, Int'l Search Report of ISA, dated Apr. 2, 2015.

* cited by examiner ary agreement between Assignee Solidia Technologies, Inc. and
PERVIOUS COMPOSITE MATERIALS, METHODS OF PRODUCTION AND USES THEREOF

PRIORITY CLAIMS AND RELATED PATENT APPLICATIONS

This application claims the benefit of priority from U.S. Provisional Application Ser. No. 61/832,242 filed on Jun. 7, 2013, the entire content of which is incorporated herein by reference in its entirety.

THE NAMES OF THE PARTIES TO A JOINT RESEARCH AGREEMENT

This invention resulted from work under a joint research agreement between Assignee Solidia Technologies, Inc. and Rutgers, The State University of New Jersey.

FIELD OF THE INVENTION

The invention generally relates to pervious composite materials. More particularly, the invention relates to novel pervious composite materials, and formulations and methods for their manufacture and uses. These pervious composite materials are suitable for a variety of applications in construction, pavements and landscaping, and infrastructure.

BACKGROUND OF THE INVENTION

Pervious concrete is a unique class of concrete characterized by a network of interconnected pores within the concrete material. The pores within pervious concrete are typically of large size and occupy a significant volume fraction. The high porosity (or pore volume) allows pervious concrete to be used in flatwork applications so that water from precipitation and other sources can pass directly through the material, thus reducing runoff from a site and facilitating groundwater recharge. Pervious concrete is usually made using coarse aggregates (having particle size between 4.75 mm and 25 mm) with little or no fine aggregates (having particle size between 0.25 mm and 4.75 mm). The amount of porosity and pore structure play a significant role in the overall performance of this material.

Despite the benefits of using pervious concrete pavements, significant drawbacks and challenges need to be addressed. These include: limited use in high volume traffic areas; need for specialized construction practices; extended curing time; durability and weather resistance; and sensitivity to water content and control in fresh concrete.

Thus, there is an on-going need for novel pervious composite materials that match or exceed the physical and performance characteristics of conventional pervious concretes, and that can be mass-produced at lower cost with improved energy consumption and more desirable carbon footprint.

SUMMARY OF THE INVENTION

The invention is based in part on the unexpected discovery of novel pervious composite materials that possess excellent physical and performance characteristics matching or exceeding those of conventional pervious concretes. These composite materials can be readily produced from widely available, low cost raw materials by a process suitable for large-scale production with reduced equipment need, improved energy consumption, and more desirable carbon footprint.

The formulation of pervious composite materials of the invention requires mostly readily available and low-cost materials that have minimal environmental impact. The raw materials include precursor materials such as particulate calcium silicate materials that become bonding elements, and aggregates (e.g., filler materials such as trap rock, sand, perlite or vermiculite). A fluid component is provided as a reaction medium, comprising liquid water and/or water vapor, and a reagent, comprising carbon dioxide ($CO_2$), which is consumed in the production as a reactive species and ends up sequestered in the final product.

Depending on end user requirements, various additives can be used to improve mixture consistency and flow and to fine-tune the physical appearance and mechanical properties of the resulting composite material. These additives may include chemical admixtures, rheology modifying admixtures, and pigments. Additive materials may also include natural, synthetic or recycled materials, as well as additives to the fluid component, such as a water-soluble dispersant.

In addition, the pervious composite materials of the invention can be produced using the efficient gas-assisted hydrothermal liquid phase sintering (HLPS) process at low cost, with less demanding equipment, and with much improved energy consumption and carbon footprint.

In one aspect, the invention generally relates to a pervious composite material. The pervious composite material includes: a plurality of bonding elements; a plurality of aggregates, which can either be fine or coarse, having particle size from 0.25 mm to about 25 mm; and a plurality of pores having sizes from about 0.10 mm to about 10 mm. Each bonding element includes: a core comprising primarily calcium silicate, a silica-rich first or inner layer, and a calcium carbonate-rich second or outer layer. The plurality of bonding elements and the plurality of aggregates together form one or more bonding matrices and the bonding elements and the aggregates are substantially evenly dispersed therein and bonded together. The plurality of pores account for from about 5 vol. % to about 50 vol. % of the pervious composite material and forms interconnected channels allowing the composite material to be permeable. The pervious composite material is characterized by a density from about 1,500 kg/$m^3$ to 2,200 kg/$m^3$, a compressive strength from about 3.0 MPa to about 30 MPa, a flexural strength from about 0.3 MPa to about 4.0 MPa, and the flow rate or water permeability from about 100 cm/hr to about 8,000 cm/hr.

In another aspect, the invention generally relates to a process for producing a pervious composite material. The process includes: forming a wet mixture; casting the wet mixture in a mold; and curing the casted wet mixture at a temperature in the range from about 10° C. to about 100° C. for about 6 hour to about 60 hours under an atmosphere of water vapor and $CO_2$. The wet mixture includes: water, particulate calcium silicate materials that become bonding elements, and aggregates having sizes of about 0.25 mm to about 25 mm.

In yet another aspect, the invention generally relates to a pervious composite material prepared by a process disclosed herein.

In yet another aspect, the invention generally relates to an article of manufacture made from a pervious composite material disclosed herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
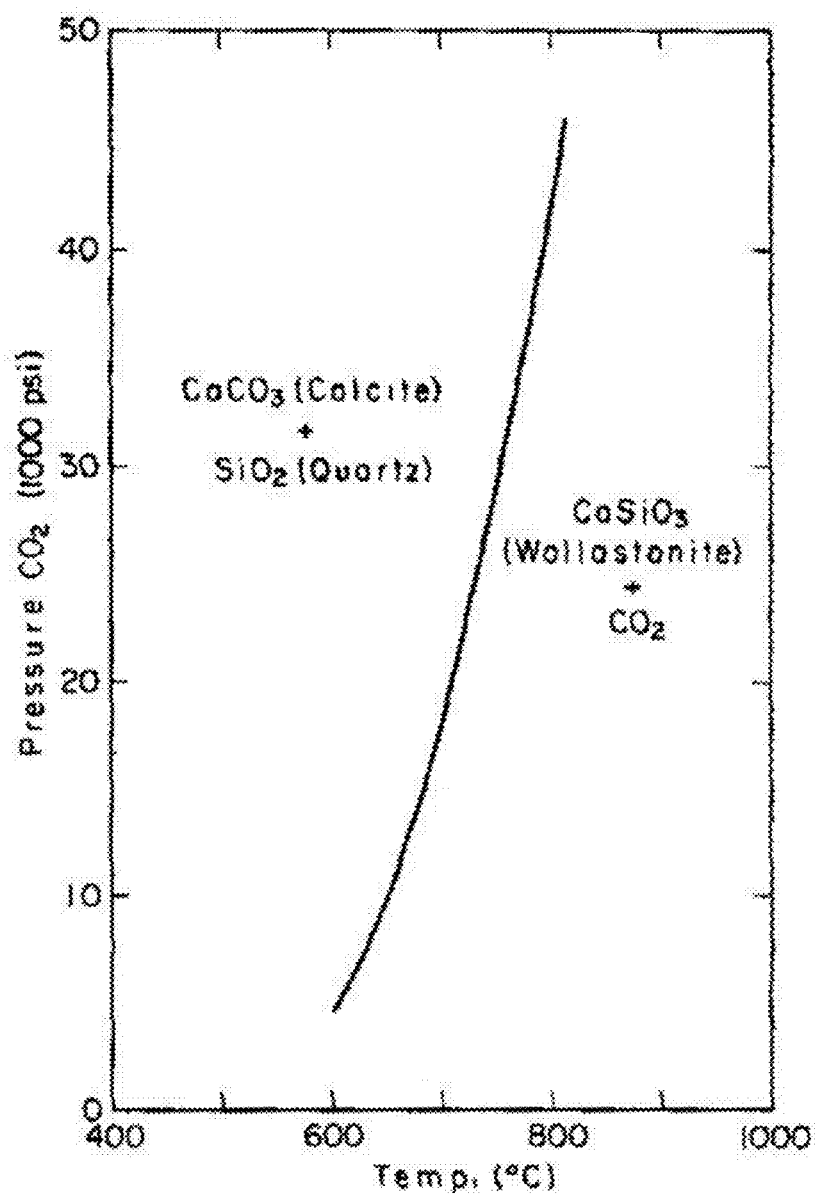
FIG. 1 is a pressure-temperature phase diagram showing the phases present in the reversible reaction $CaCO_3 + SiO_2 \leftrightarrow CaSiO_3$ (Wollastonite)$+CO_2$.
Figure 2:
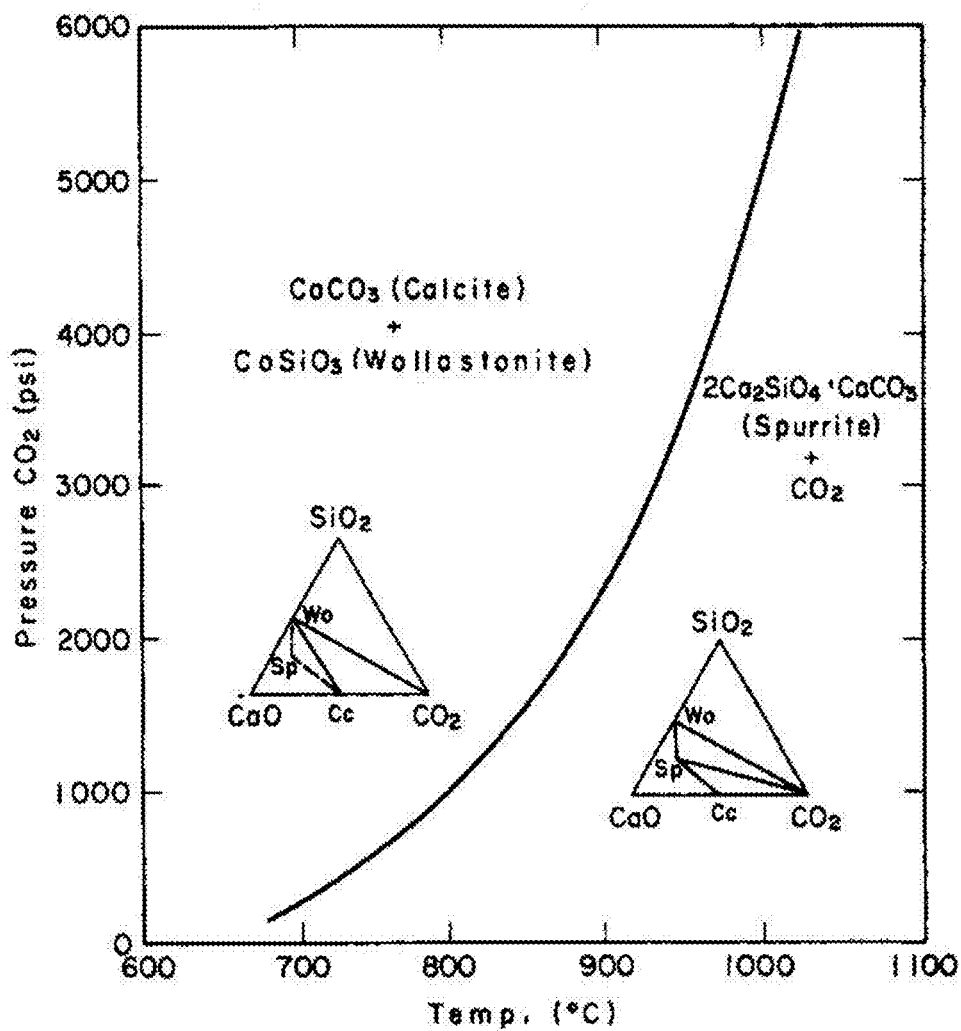
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
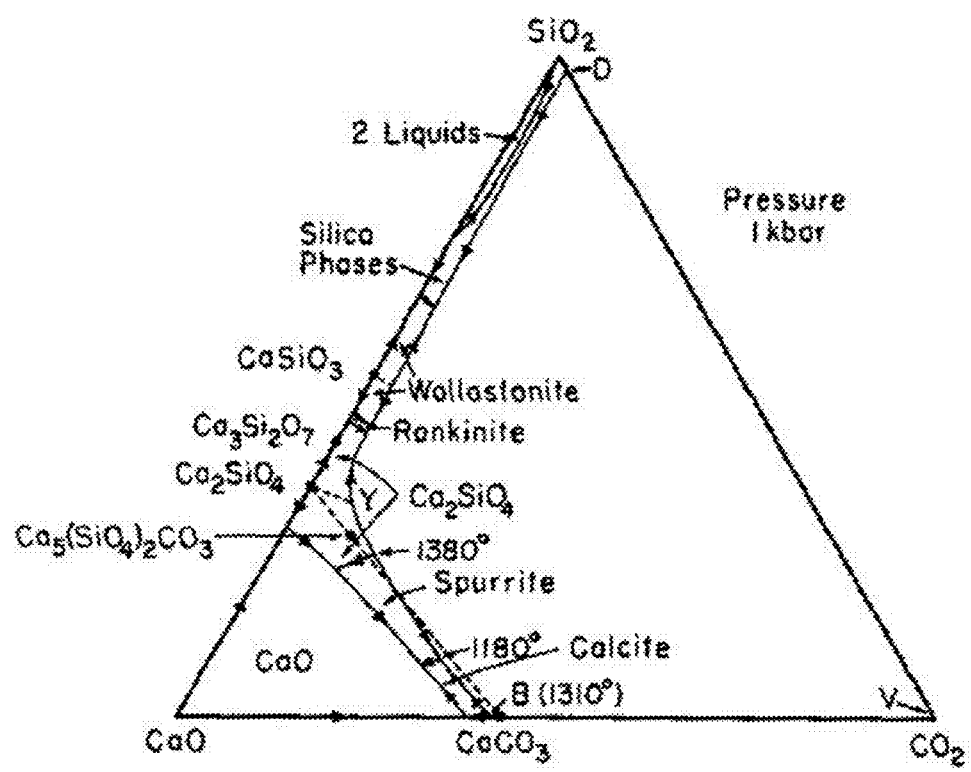
FIG. 3 is a phase diagram of the $CaO—SiO_2—CO_2$ system at a pressure of 1 kilobar.
Figure 4:
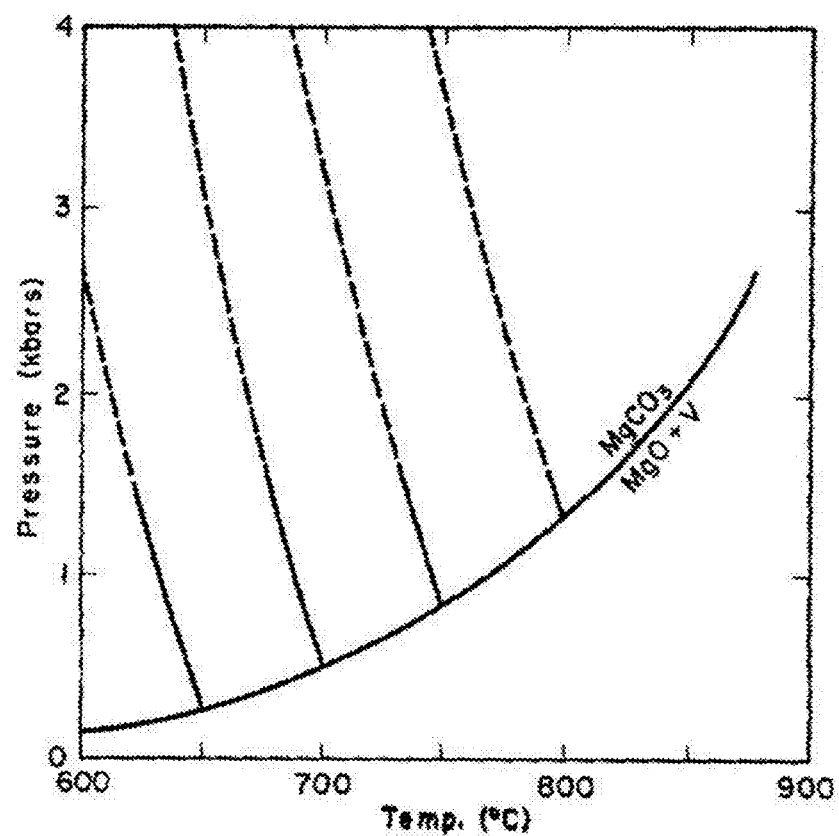
FIG. 4 is a pressure-temperature phase diagram showing the phases present in the reversible reaction $MgO+CO_2 \leftrightarrow MgCO_3$.
Figure 5:
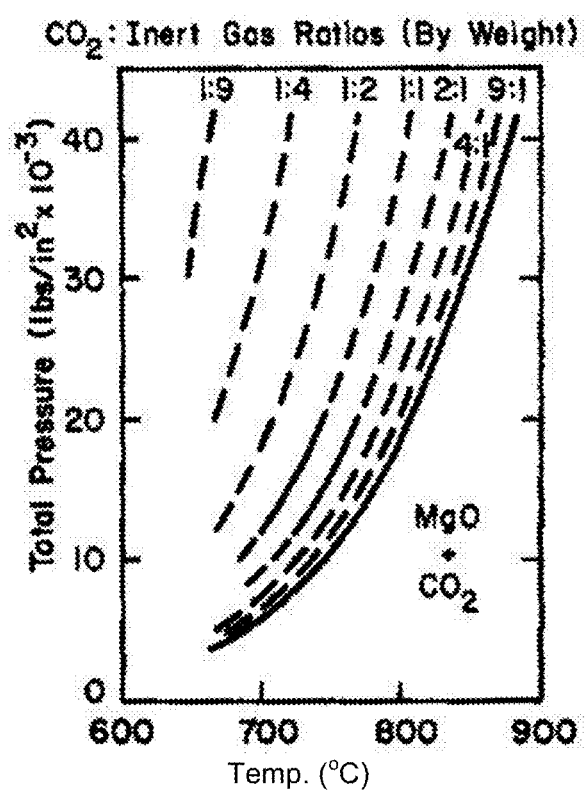
FIG. 5 is a pressure-temperature phase diagram showing the equilibrium curves for the reversible reaction $MgO+CO_2 \leftrightarrow MgCO_3$ as a function of the proportion of $CO_2$ in an inert gas.
Figure 6:
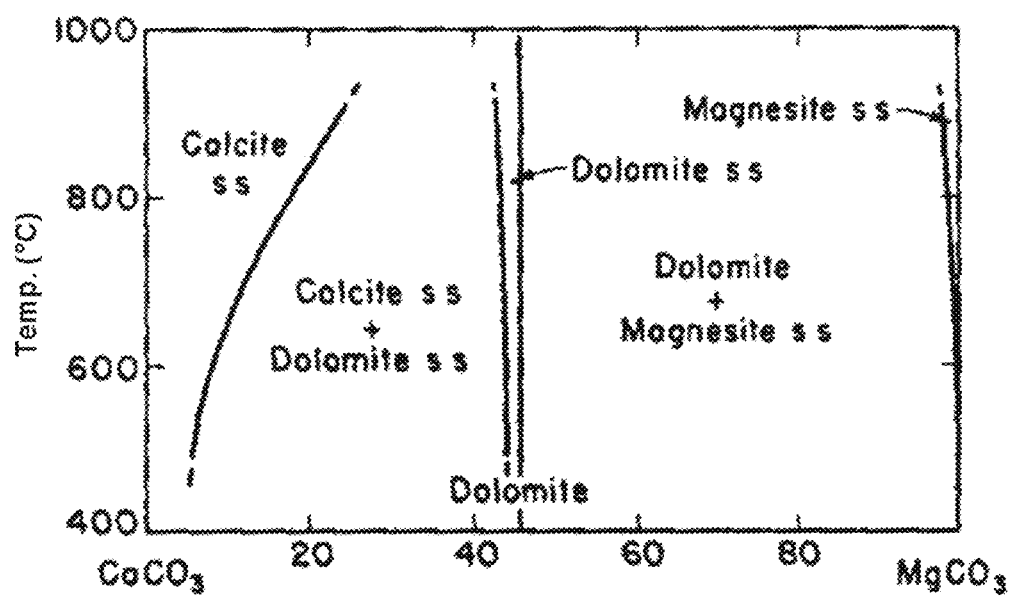
FIG. 6 is a temperature-composition phase diagram that illustrates the stability regions for various phases in the $CaCO_3 \leftrightarrow MgCO_3$ system.
Figure 7:
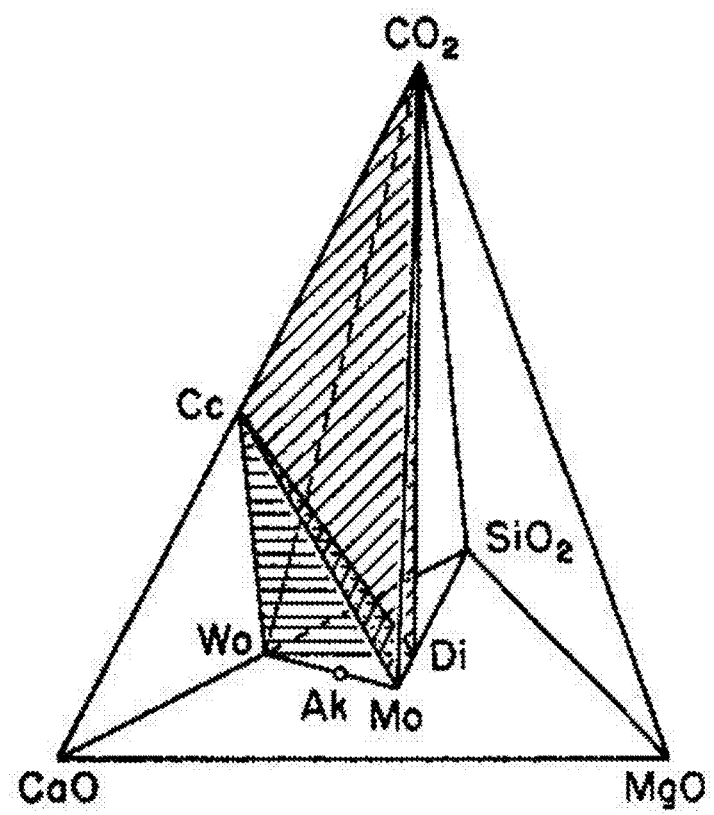
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
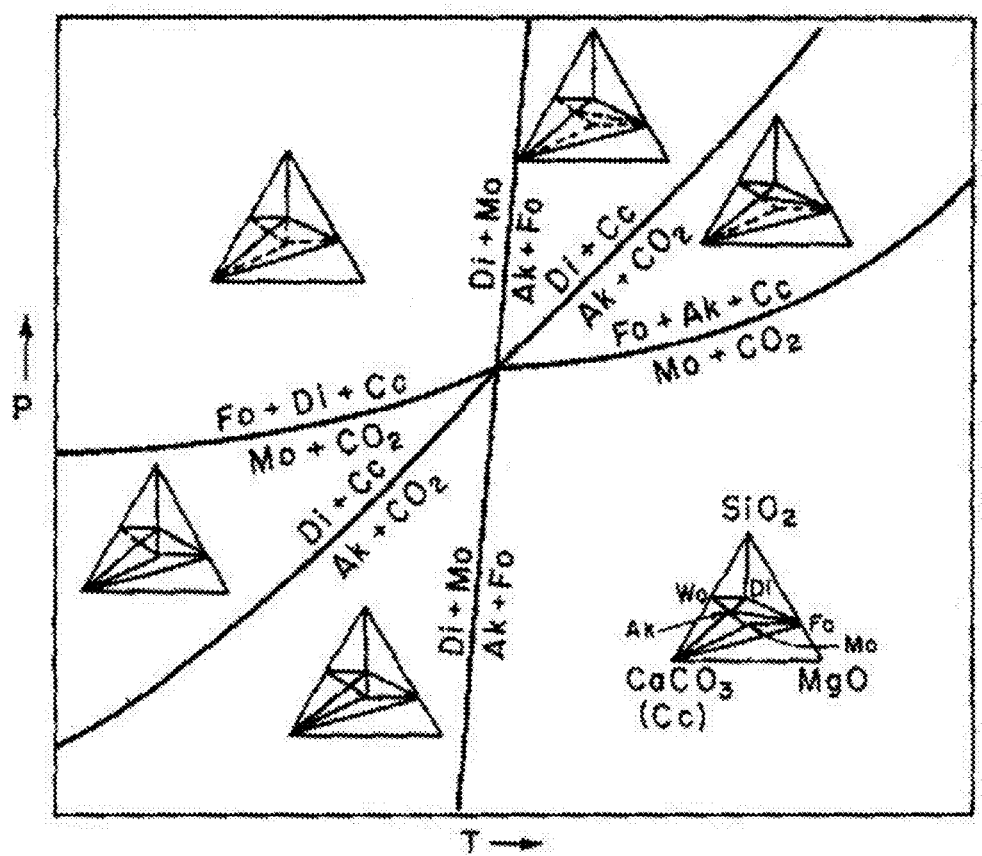
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound system $CaCO_3$, MgO, $SiO_2$.

This invention provides novel pervious composite materials and products manufactured therefrom that possess excellent physical and performance properties (meeting or exceeding that of conventional pervious concretes) but can be readily produced from widely available, low cost raw materials by a process suitable for large-scale production with improved energy consumption, reduced production cycle (e.g., less curing time), reduced equipment need (e.g., without the need for autoclaves), and more desirable carbon footprint.

The pervious composite materials of the invention can be readily prepared with large dimensions such as pavements, driveways, parking lots, sidewalks, pathways, tennis courts, well linings, patios, swimming pool decks, noise barriers and even load bearing walls, etc. They can be used either in load-bearing or non load-bearing applications.

The pervious composite materials of the invention exhibit excellent durability, water permeability, as well as, load-bearing capability. They can be produced at large-scales with much improved energy efficiency and more desirable carbon footprint than conventional pervious concrete. The production of the pervious composite materials consumes $CO_2$ resulting in $CO_2$ net sequestration thereby making it carbon-neutral and exceptionally efficient from both financial and environmental conservation perspectives. Additional benefits brought about by the unique pervious composite materials of the invention are reduction of curing time, reduction of material use, the ability to use recycled products, and avoidance of toxic emissions.

In one aspect, the invention generally relates to a pervious composite material. The pervious composite material includes: a plurality of bonding elements; a plurality of aggregates having sizes of about 0.25 mm to about 25 mm; and a plurality of pores having sizes from about 0.1 mm to about 10 mm. Each bonding element includes: a core comprising primarily calcium silicate, a silica-rich first or inner layer, and a calcium carbonate-rich second or outer layer. The plurality of bonding elements and the plurality of aggregates together form one or more bonding matrices and the bonding elements and the aggregates are substantially evenly dispersed therein and bonded together. The plurality of pores account for from about 5 vol. % to about 50 vol. % of the pervious composite material and form interconnected channels allowing the composite material to be permeable. The pervious composite material is characterized by a density from about 1,500 kg/m$^3$ to 2,200 kg/m$^3$, a compressive strength from about 3.0 MPa to about 30 MPa, a flexural strength from about 0.3 MPa to about 4.0 MPa, and a permeability from about 100 cm/hr to about 8,000 cm/hr.

Any suitable calcium silicate may be used as a precursor for the bonding elements. As used herein, the term "calcium silicate" refers to naturally-occurring minerals or synthetic materials that are comprised of one or more of a group of calcium-silicon-containing compounds including $CaSiO_3$ (also known as "wollastonite" and pseudo-wollastonite, and sometimes formulated as $CaO \cdot SiO_2$), $Ca_3Si_2O_7$ (also known as Rankinite and sometimes formulated as $3CaO \cdot 2SiO_2$), $Ca_2SiO_4$ (also known as "Belite" and sometimes formulated as $2CaO \cdot SiO_2$), $Ca_3SiO_5$ (also known as "Alite" and sometimes formulated as $3CaO \cdot SiO_2$), which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It should be understood that, compositions and methods disclosed herein can be adopted to use magnesium silicate in place of or in addition to calcium silicate. As used herein, the term "magnesium silicate" refers to naturally-occurring minerals or synthetic materials that are comprised of one or more of a groups of magnesium-silicon-containing compounds including, for example, $Mg_2SiO_4$ (also known as "Fosterite") and $Mg_3Si_4O_{10}(OH)_2$ (also known as "Talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The plurality of bonding elements may have any suitable median particle size and size distribution dependent on the desired composite material. In certain embodiments, the plurality of bonding elements have a median particle size in the range of about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

In certain preferred embodiments, the plurality of bonding elements are chemically transformed from ground calcium silicate and the filler particles are lime particles. In certain preferred embodiments, the plurality of bonding elements are chemically transformed from a precursor calcium silicate comprising one or more of aluminum, magnesium and iron. In certain preferred embodiments, wherein the plurality of bonding elements are chemically transformed from a precursor calcium silicate other than ground calcium silicate (e.g., ground Wollastonite).

In certain preferred embodiments, the plurality of bonding elements are prepared by chemical transformation from ground calcium silicate by reacting it with $CO_2$ via a controlled hydrothermal liquid phase sintering (HLPS) process. In certain preferred embodiments, the plurality of bonding elements are prepared by chemical transformation from the precursor calcium silicate other than ground calcium silicate (e.g., ground Wollastonite) by reacting it with $CO_2$ via a controlled HLPS process.

The plurality of pores play an important role in the overall performance of the pervious composite material, including the density, permeability, mechanical properties, weather resistance, etc. The plurality of pores may account for any suitable fraction of the overall volume of the pervious composite material dependent on the desired properties and applications at hand. For example, the plurality of pores may account for from about 5 vol. % to about 40 vol. % (e.g., about 5% to about 35%, about 5% to about 30%, about 5% to about 25%, about 10% to about 40%, about 10% to about 35%, about 10% to about 30%, about 10% to about 25%, about 20% to about 40%) of the overall volume of the pervious composite material.

Any suitable aggregates may be used, for example, calcium oxide-containing or silica-containing materials. Exemplary aggregates include inert materials such as trap rock, construction sand, pea-gravel. Materials such as industrial waste materials (e.g., fly ash, slag, silica fume) may also be used as aggregates. In certain preferred embodiments, lightweight aggregates such as perlite or vermiculite may also be used as aggregates.

The plurality of aggregates may have any suitable median particle size and size distribution. In certain embodiments, the plurality of aggregates has a median particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

The pervious composite material may be prepared to exhibit a desired density and mechanical properties depending on the requirements of the application or the site conditions (e.g., ASTM C1688/C1688M, ASTM C1709/C1709M).

For example, the pervious composite material may be characterized by a density from about 1,500 kg/m$^3$ to 2,200 kg/m$^3$ (e.g., about 1,600 kg/m$^3$ to 2,000 kg/m$^3$, about 1,700 kg/m$^3$ to 2,000 kg/m$^3$, about 1,500 kg/m$^3$, about 1,600 kg/m$^3$, about 1,700 kg/m$^3$, about 1,800 kg/m$^3$, about 1,900 kg/m$^3$, about 2,000 kg/m$^3$, about 2,200 kg/m$^3$).

The pervious composite materials of the invention exhibit excellent compressive strength. For example, the pervious composite material may be characterized by a compressive strength from about 3.0 MPa to about 30 MPa (e.g., from about 3.0 MPa to about 25.0 MPa, from about 3.0 MPa to about 20.0 MPa, from about 3.0 MPa to about 18.0 MPa, from about 4.0 MPa to about 16.0 MPa, from about 5.0 MPa to about 30.0 MPa, from about 5.0 MPa to about 25.0 MPa, from about 5.0 MPa to about 20.0 MPa, from about 5.0 MPa to about 15.0 MPa, from about 6.0 MPa to about 20.0 MPa, from about 6.0 MPa to about 15.0 MPa, from about 6.0 MPa to about 12.0 MPa, about 10.0 MPa).

The pervious composite materials of the invention also exhibit excellent flexural strength. For example, the pervious composite material may be characterized by a flexural strength from about 0.3 MPa to about 4.0 MPa (e.g., from about 0.5 MPa to about 4.0 MPa, from about 0.7 MPa to about 4.0 MPa, from about 1.0 MPa to about 4.0 MPa, from about 1.5 MPa to about 4.0 MPa, from about 2.0 MPa to about 4.0 MPa, about 0.5 MPa, about 1.0 MPa, about 1.5 MPa, about 2.0 MPa, about 2.5 MPa, about 3.0 MPa, about 3.5 MPa, about 4.0 MPa).

The pervious composite material may further include one or more additives to modify the appearance, physical or mechanical properties of the product. Exemplary additives may include chemical admixtures and pigments.

Chemical admixtures may include plasticizers, retarders, accelerators, dispersants and other rheology-modifying agents. Certain commercially available chemical admixtures such as Glenium™ 7500 by BASF® Chemicals and Acumer™ by Dow Chemical Company may also be included.

In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%,).

In another aspect, the invention generally relates to a process for producing a pervious composite material. The process includes: forming a wet mixture; casting the wet mixture in a mold; and curing the casted wet mixture at a temperature in the range from about 10° C. to about 100° C. for about 6 hour to about 60 hours under an atmosphere of water vapor and $CO_2$. The wet mixture includes: water, a particulate ground calcium silicate materials, and aggregates having sizes of about 0.25 mm to about 25 mm.

In certain preferred embodiments, the step of forming a wet mixture comprises mixing the following ingredients in the specified order of addition: adding and mixing aggregates; adding a first portion of water; adding and mixing ground calcium silicate; adding and mixing a second portion of water. The first portion of water accounts for about 40% to about 60% of the total water content and the second portion of water accounts for about 40% to about 60% of the total water content in the wet mixture. In an exemplary embodiment, the first portion of water accounts for about 50% of the total water content and the second portion of water accounts for about 50% of the total water content in the wet mixture.

Curing temperature and time may be adjusted according to the desired end product, for example, at a temperature in the range from about 10° C. to about 100° C. (e.g., from about 10° C. to about 90° C., from about 20° C. to about 90° C., from about 30° C. to about 90° C., from about 40° C. to about 90° C., from about 40° C. to about 80° C., from about 50° C. to about 70° C., from about 60° C. to about 100° C.) for about 6 hours to about 60 hours (e.g., for about 6 hours to about 60 hours, for about 10 hours to about 60 hours, for about 6 hours to about 40 hours, for about 10 hours to about 40 hours, for about 10 hours to about 30 hours, for about 15 hours to about 25 hours, for about 20 hours) under an atmosphere of water and $CO_2$.

The relative humidity environment of the curing process may be adjusted to fit the desired outcome, for example, ranging from about 50% to about 98% (e.g., from about 60% to about 98%, from about 70% to about 98%, from about 80% to about 98%, from about 90% to about 98%, from about 50% to about 90%, from about 50% to about 80%, from about 50% to about 70%) and with a $CO_2$ pressure ranging from about ambient atmospheric pressure to about 100 psi above ambient atmospheric pressure (e.g., from about ambient atmospheric pressure to about 90 psi above ambient, from about ambient atmospheric pressure to about 80 psi above ambient, from about ambient atmospheric pressure to about 70 psi above ambient, from about ambient atmospheric pressure to about 60 psi above ambient, from about 20 above ambient to about 100 psi above ambient, from about 30 above ambient to about 100 psi above ambient), and having a $CO_2$ concentration ranging from about 10% to about 90% (e.g., from about 20% to about 90%, from about 30% to about 90%, from about 40% to about 90%, from about 10% to about 70%, from about 10% to about 50%) to produce a pervious composite material exhibiting a uniform, homogeneous, and highly porous structure.

In exemplary productions as in some embodiments of the invention, the materials used are ground calcium silicate.

The ground calcium silicate may have a median particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a surface area from about 1.5 m$^2$/g to about 3.5 m$^2$/g (e.g., 1.5 m$^2$/g, 2.0 m$^2$/g, 2.3 m$^2$/g, 2.5 m$^2$/g, 2.8 m$^2$/g, 3.0 m$^2$/g, 3.2 m$^2$/g, 3.5 m$^2$/g).

In certain preferred embodiments, the particulate composition comprises about 10 wt. % to about 95 wt. % of ground calcium silicate materials (e.g., about 20 wt. % to about 95 wt. %, about 30 wt. % to about 95 wt. %, about 50 wt. % to about 95 wt. %, about 60 wt. % to about 95 wt. %, about 20 wt. % to about 90 wt. %, about 20 wt. % to about 80 wt. %, about 20 wt. % to about 70 wt. %, about 30 wt. % to about 80 wt. %, about 50 wt. % to about 80 wt. %).

Liquid water in the pores speeds up the reaction rate because it is essential for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is delivered to the precursor materials in liquid form with $CO_2$ dissolved therein and the curing process is conducted at about 90° C. and about 20 psig (i.e., 20 psi above ambient pressure) for about 48 hours. In a second exemplary embodiment, water is present in the precursor material (e.g., as residual water from prior mixing step) and water vapor is provided to precursor materials (e.g., to maintain water level and/or prevent loss of water from evaporating) along with $CO_2$ and the curing process is performed at about 60° C. and 0 psig (at ambient atmospheric pressure) for about 19 hours. In a third exemplary embodiment, water is delivered to precursor materials in vapor form along with $CO_2$ and the curing process is performed at about 90° C. and 20 psig (20 psi above ambient atmospheric pressure) for about 19 hours.

In yet another aspect, the invention generally relates to a pervious composite material prepared by a process disclosed herein.

In yet another aspect, the invention generally relates to an article of manufacture made from a pervious composite material disclosed herein.

Pervious composite materials of the invention may be used to manufacture a wide range of products of various sizes and dimensions including, for example, pavements, driveways, parking lots, sidewalks, pathways, tennis courts, well linings, patios, swimming pool decks, noise barriers and even load bearing walls, etc.

Pervious composite materials of the invention as a pavement material provide a number of benefits in safety, performance, and environmental and economical impact. The high pore volume makes it highly permeable and allows the water to drain quickly through the material rather than allowing the water to drain over the material. This eliminates the pooling of water on the surface of the composite material, which enhances traction for vehicles and prevents hazardous driving conditions occurring due to severe weather such as heavy rain and snow, such as hydroplaning. This also minimizes the spraying of water from the pavement surface.

The use of pervious pavement also helps in recharging the ground water table. Additionally, there is a reduction of urban heat-island effect due its permeable characteristics and relatively lighter appearance, and reduction in the need of irrigation water in urban areas by allowing the water to be stored in soils so that vegetation can be grown in adjacent areas. The pervious composite materials of the invention as pavements can eliminate the need for construction of other expensive measures for storm water runoff control, such as retention ponds, swales and lagoons.

It is noted that the properties, production time and scale of the pervious composite materials can be fine tuned based on the disclosures herein, for example, by adjusting curing techniques (e.g., $CO_2$ delivery, system pressure and temperature) as well as mixture proportions and constituents.

Thus, a variety of products can be produced from widely available, low cost raw materials by a process that does not require autoclave(s) and is suitable for continuous, large-scale production. The production methods are much improved over conventional pervious concretes in terms of both economics and environmental impact.

Bonding Elements, Bonding Matrices and Composite Materials
Chemical Discussion

This invention provides apparatus and methods used to manufacture novel composite materials that are cured predominantly by a $CO_2$ consumption reaction. The materials exhibit useful properties and can be readily produced from widely available, low cost precursor materials by a process suitable for large-scale production with minimal environmental impact. The precursor materials include inexpensive and abundant calcium silicate rich materials, fine particles and coarse particles. The calcium silicate rich materials may be comprised of ground Wollastonite. The fine and coarse particles may be comprised of ground limestone or other calcium carbonate based materials, ground quartz or other $SiO_2$ based materials, sand and crushed rock. The fine and coarse particles may also be comprised of crushed minerals such as granite, mica and feldspar. Other process components include water and $CO_2$. Various additives can be used to modify and fine-tune the physical appearance and/or mechanical properties of the resulting composite material, such as additives selected from one or more of pigments (e.g., black iron oxide, cobalt oxide and chromium oxide), colored glass and/or colored quartz. Additives regarding water usage reduction and changes in rheology can also be used.

The composite materials can be produced, as disclosed herein, using the energy-efficient Hydrothermal Liquid Phase Sintering (HLPS) process to create bonding elements which hold together the various components of the composite material. The composite materials can be manufactured at low cost and with favorable environmental impact. For example in preferred embodiments of the invention, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. patent application Ser. Nos. 14/045,758, 14/045,519, 14/045,766, 14/045,540, all filed Oct. 3, 2013, U.S. patent application Ser. Nos. 14/207,413, 14/207,421, filed Mar. 12, 2014, U.S. patent application Ser. Nos. 14/207,920, 14/209,238, filed Mar. 13, 2014, each of which is expressly incorporated herein by reference in its entirety for all purposes.

As used herein, the term "calcium silicate" refers to naturally-occurring minerals or synthetic materials that are comprised of one or more of a group of calcium-silicon-containing compounds including $CaSiO_3$ (also known as "Wollastonite" or "pseudo-wollastonite" and sometimes formulated as $CaO.SiO_2$), $Ca_3Si_2O_7$ (also known as "Rankinite" and sometimes formulated as $3CaO.2SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), and $Ca_5(SiO_4)_2CO_3$ (also known as "Spurrite" and sometimes formulated as $2Ca_2SiO.CaCO_3$), each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. FIG. 1 through FIG. 8 are phase diagrams that show various phase interrelationships among some of the materials described.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more of a groups of magnesium-silicon-containing compounds including, for example, $Mg_2SiO_4$ (also known as "Fosterite"), $Mg_3Si_4O_{10}(OH)_2$) (also known as "Talc"), and $CaMgSiO_4$ (also known as "Monticellite"), each of which materials may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

In certain preferred embodiments, the plurality of bonding elements are prepared by chemical transformation from ground Wollastonite (or a non-Wollastonite precursor calcium silicate or magnesium silicate) by reacting it with $CO_2$ via a gas-assisted HLPS process.

In certain embodiments, the composite material is characterized by a compressive strength from about 90 MPa to about 175 MPa (e.g., about 90 MPa to about 150 MPa, about 90 MPa to about 140 MPa, about 90 MPa to about 130 MPa, about 90 MPa to about 120 MPa, about 90 MPa to about 110 MPa, about 100 MPa to about 175 MPa, about 120 MPa to about 175 MPa, about 130 MPa to about 175 MPa, about 140 MPa to about 175 MPa, about 150 MPa to about 175 MPa, about 160 MPa to about 175 MPa).

In certain embodiments, the composite material is characterized by a flexural strength from about 5 MPa to about 30 MPa (e.g., about 5 MPa to about 25 MPa, about 5 MPa to about 20 MPa, about 5 MPa to about 15 MPa, about 5 MPa to about 10 MPa, about 10 MPa to about 30 MPa, about 20 MPa to about 30 MPa, about 25 MPa to about 30 MPa).

In certain embodiments, the composite material is characterized by water absorption of less than about 10% (e.g., less than about 8%, 5%, 4%, 3%, 2%, or 1%).

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Equipment and Processing Discussion
$CO_2$ Control

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so s to maintain a concentration of $CO_2$ sufficient to drive the curing reaction.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 9:
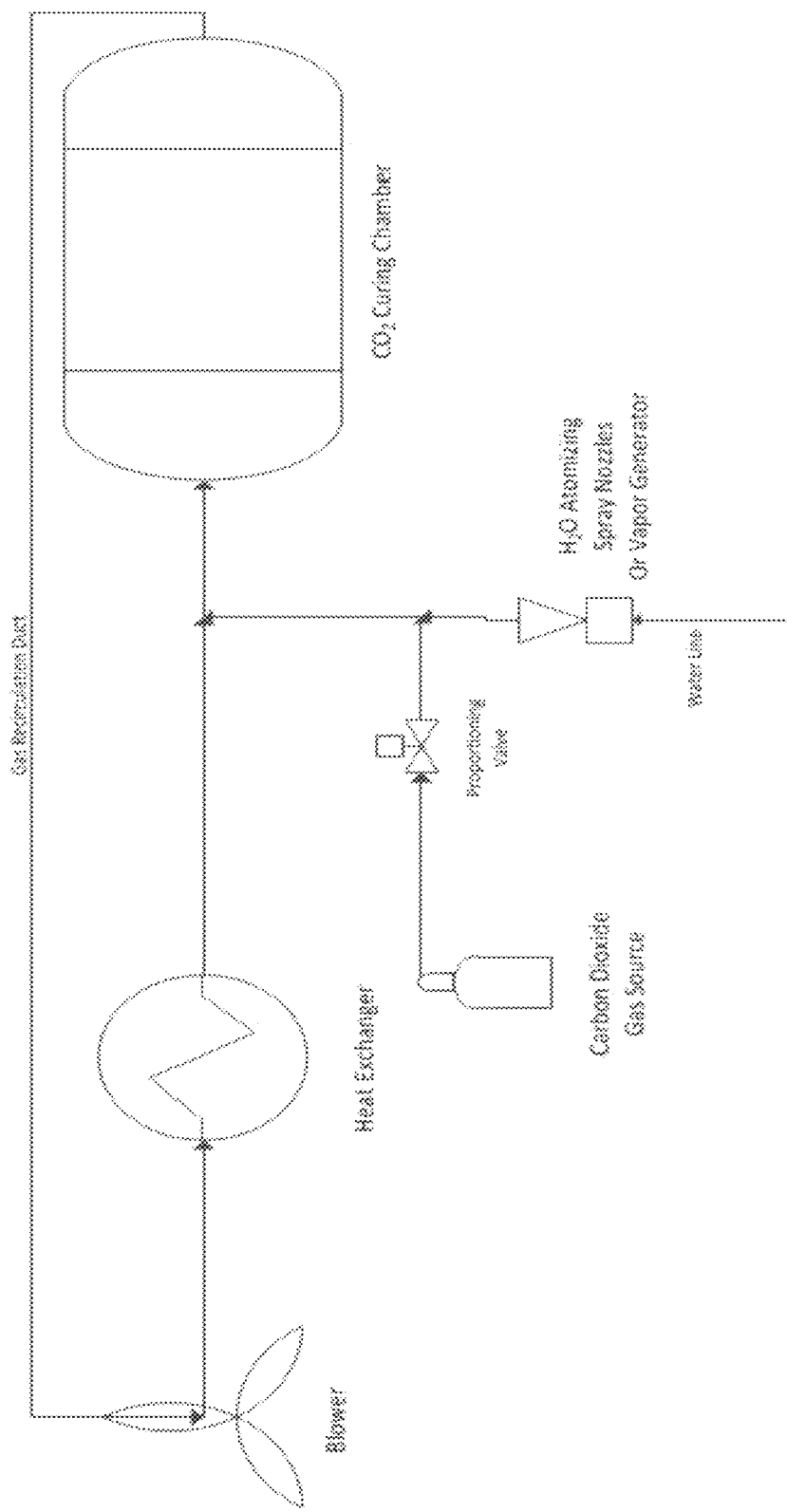
FIG. 9 is a schematic diagram of a $CO_2$ composite material curing chamber that provides humidification according to principles of the invention.

FIG. 9 is a schematic diagram of a $CO_2$ composite material curing chamber that provides humidification according to principles of the invention. In FIG. 9, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ composite material curing processes that could be combined into a single system. One method for humidification in one embodiment of a $CO_2$ curing system is represented in FIG. 9. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 10:
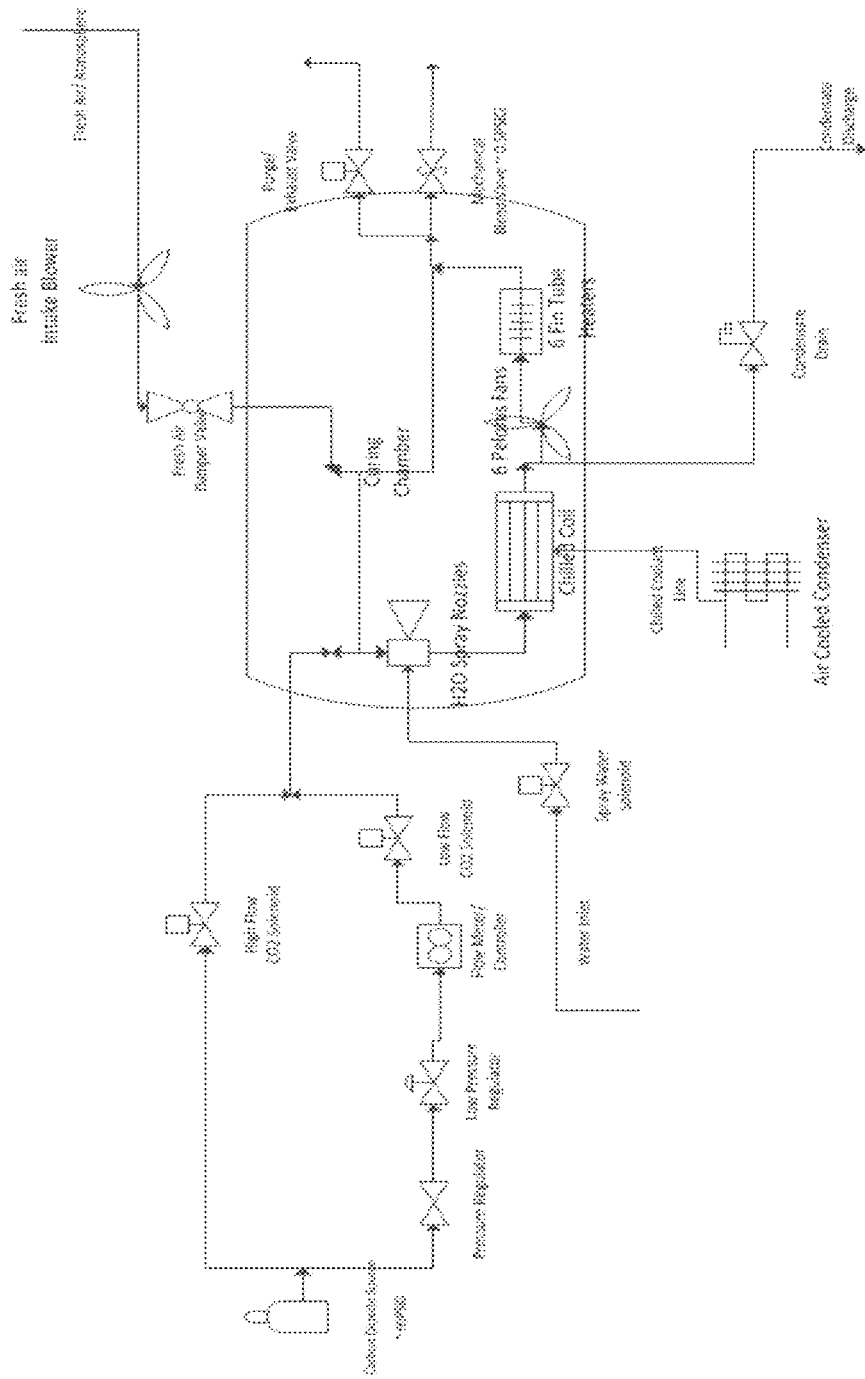
FIG. 10 is a schematic diagram of a curing chamber with multiple methods of humidity control as well as ability to control and replenish $CO_2$ using constant flow or pressure regulation and that can control the temperature according to principles of the invention.

FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

Process of Preparing a Composite Material

We describe a process for preparing a composite material. The process includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern and the desired physical properties related to compressive strength, flexural strength, density, resistance to degradation, and so forth.

The particulate composition includes a ground calcium silicate having a median particle size in the range from about 1 μm to about 100 μm. In addition the particulate composition may include a ground calcium carbonate or a $SiO_2$ bearing material having a median particle size in the range from about 3 μm to about 25 mm. The liquid composition includes water and may include a water-soluble dispersant.

The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hour to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 hour to about 50 hours under a vapor comprising water and $CO_2$ and having an ambient atmospheric pressure.

For example, in some embodiments, the ground calcium silicate has a median particle size from about 1 μm to about 100 μm (e.g., about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a surface area from about 1.5 m$^2$/g to about 3.5 m$^2$/g (e.g., 1.5 m$^2$/g, 2.0 m$^2$/g, 2.3 m$^2$/g, 2.5 m$^2$/g, 2.8 m$^2$/g, 3.0 m$^2$/g, 3.2 m$^2$/g, 3.5 m$^2$/g).

In certain preferred embodiments, the liquid composition includes water and a water-soluble dispersant comprising a polymer salt (e.g., an acrylic homopolymer salt) having a concentration from about 0.1% to about 2% w/w of the liquid composition.

Composite materials prepared according to a process disclosed herein can exhibit a compressive strength from about 3.0 MPa to about 30.0 MPa (e.g., 3 MPa, 5 MPa, 10 MPa, 15 MPa, 20 MPa, 25 MPa, 30 MPa) and a flexural strength from about 0.3 MPa to about 4.0 MPa (e.g., 0.3 MPa, 0.5 MPa, 1.0 MPa, 1.5 MPa, 2.0 MPa, 2.5 MPa, 3.0 MPa, 3.5 MPa, 4.0 MPa).

We also describe one or more articles of manufacture made from a composite material.

Any suitable precursor materials may be employed. For example calcium silicate particles formed primarily of Wollastonite, CaSiO$_3$, can react with carbon dioxide dissolved in water. It is believed that calcium cations are leached from the Wollastonite and transform the peripheral portion of the Wollastonite core into calcium-deficient Wollastonite. As the calcium cations continue to be leached from the peripheral portion of the core, the structure of the peripheral portion eventually become unstable and breaks down, thereby transforming the calcium-deficient Wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1) which can use water as a reaction medium, and not as a reagent (that is, the water is not consumed):

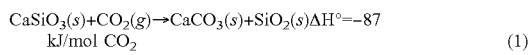

$$\text{CaSiO}_3(s) + \text{CO}_2(g) \rightarrow \text{CaCO}_3(s) + \text{SiO}_2(s) \Delta H° = -87 \text{ kJ/mol CO}_2 \quad (1)$$

For example, in a silicate mineral carbonation reaction such as with Wollastonite, CO$_2$ is introduced as a gas phase that dissolves into an infiltration fluid, such as water. The dissolution of CO$_2$ forms acidic carbonic species (such as carbonic acid, H$_2$CO$_3$) that results in a decrease of pH in solution. The weakly acidic solution incongruently dissolves calcium species from CaSiO$_3$. The released calcium cations and the dissociated carbonate species lead to the precipitation of insoluble carbonates. Silica-rich layers are thought to remain on the mineral particles as calcium depleted layers.

Thus, according to a preferred embodiment of the invention, CO$_2$ preferentially reacts with the calcium cations of the Wollastonite precursor core, thereby transforming the peripheral portion of the precursor core into a silica-rich first layer and a calcium carbonate-rich second layer. Also, the presence of the first and second layers on the core act as a barrier to further reaction between Wollastonite and carbon dioxide, resulting in the bonding element having the core, first layer and second layer.

In some embodiments, silicate materials having metals other than Ca or in addition to Ca, for example Fosterite (Mg$_2$SiO$_4$), Diopside (CaMgSi$_2$O$_6$), and Talc (Mg$_3$Si$_4$O$_{10}$(OH)$_2$) can react with carbon dioxide dissolved in water in a manner similar to the reaction of Wollastonite, as described above. It is believed that such silicate materials can be used, alone, in combination, and/or in combination with Wollastonite, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved CO$_2$. CO$_2$-based species have low solubility in pure water (1.5 g/L at 25° C., 1 atm.). Thus, a substantial quantity of CO$_2$ must be continuously supplied to and distributed throughout the porous preform to enable significant carbonate conversion. Utilizing gas phase diffusion offers a huge (about 100-fold) increase in diffusion length over that of diffusing soluble CO$_2$ an equivalent time in a liquid phase. ("Handbook of chemistry and physics", Editor: D. R. Lide, Chapters 6 and 8, 87$^{th}$ Edition 2006-2007, CRC.) This partially infiltrated state enables the reaction to proceed to a high degree of carbonation in a fixed period of time.

Liquid water in the pores speeds up the reaction rate because it provides a medium for ionization of both carbonic acid and calcium species. However, water levels need to be low enough such that CO$_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is present in the precursor material (e.g., as residual water from prior mixing step) and liquid water is provided to precursor materials (e.g., to maintain water level and/or control the loss of water from evaporating) along with CO$_2$ and the curing process is conducted at about 90° C. and about 20 psig (i.e., 20 psi above ambient pressure) for times ranging from about 2 to 90 hours.

In a second exemplary embodiment, water is present in the precursor material (e.g., as residual water from prior mixing step) and water vapor is provided to precursor materials (e.g., to maintain water level and/or control the loss of water from evaporating) along with CO$_2$ and the curing process is conducted at about 90° C. and about 20 psig (i.e., 20 psi above ambient pressure) for times ranging from about 2 to 90 hours.

In a third exemplary embodiment, water is present in the precursor material (e.g., as residual water from prior mixing step) and water vapor is provided to precursor materials (e.g., to maintain water level and/or control the loss of water from evaporating) along with CO$_2$ and the curing process is performed at about 25 to 90° C. and 0 psig (at ambient atmospheric pressure) for about 2 to 72 hours.

In the above embodiments, the time required for curing of a composite material object is determined by the ability of water vapor and CO$_2$ gas to diffuse throughout the object. In general, thicker objects take longer to cure than thinner objects. Similarly, objects with high density (and fewer open pore spaces) take longer to cure than objects with low density (and more open pore spaces). The following table provides examples of how the curing times may vary with respect to the smallest thickness (or wall thickness or section thickness) of the three dimensions and the bulk density of an object that is being manufactured.

TABLE 1

Examples of Curing Times and Smallest Thickness

| Composite Material Smallest Thickness (mm) | Composite Material Bulk Density (g/cm$^3$) | Approximate Curing Time (h) |
|---|---|---|
| 25 | 1.6-2.3 | 8-12 |
| 75 | 2.1-2.3 | 16 |
| 100 | 0.4-0.8 | 8-12 |
| 200 | 1.5 | 72 |
| 200 | 2.4 | 72 |

Discussion of Manufactured Microstructures

Figure 11:
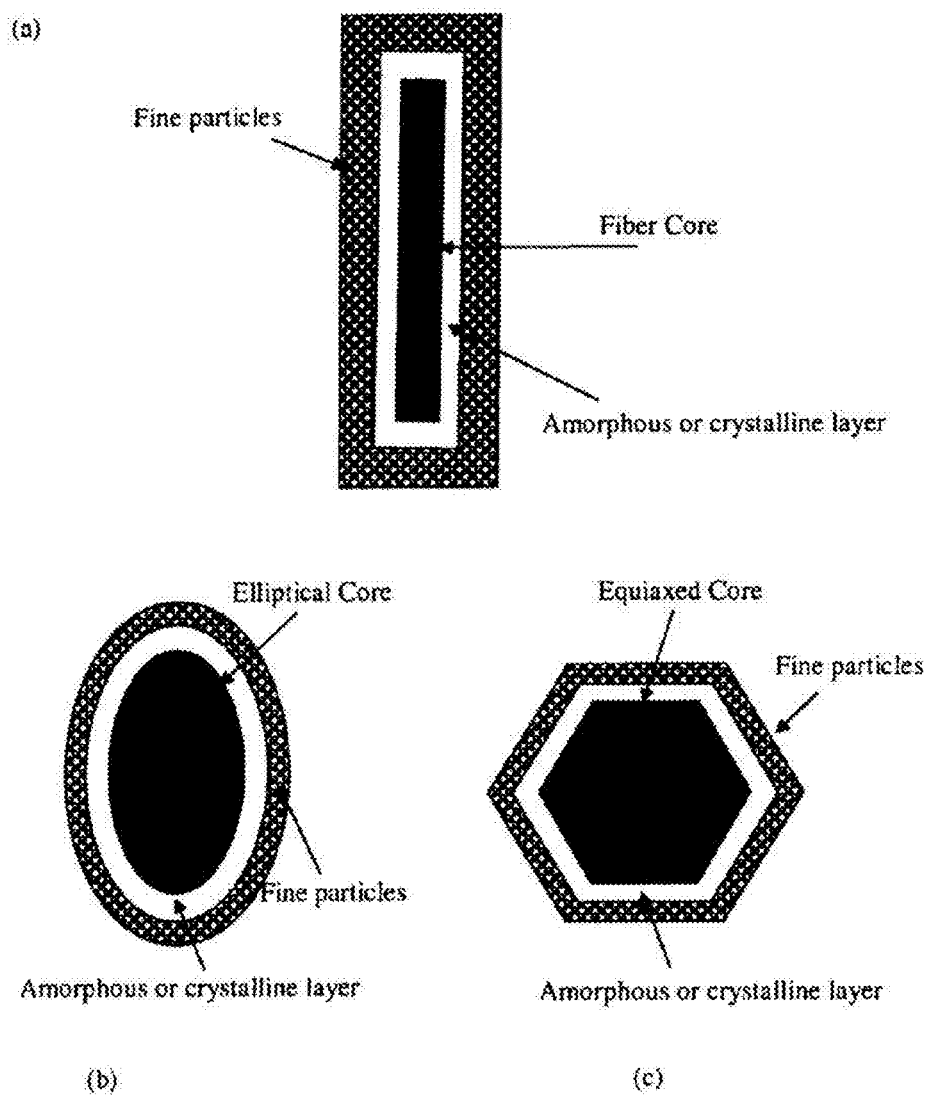
FIGS. 11(a)-11(c) are schematic illustrations of cross-sections of bonding elements according to exemplary embodiments of the present invention, including three exemplary core morphologies: (a) fibrous, (b) elliptical, and (c) equiaxed.

As schematically illustrated in FIGS. 11(a)-11(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Figure 12:
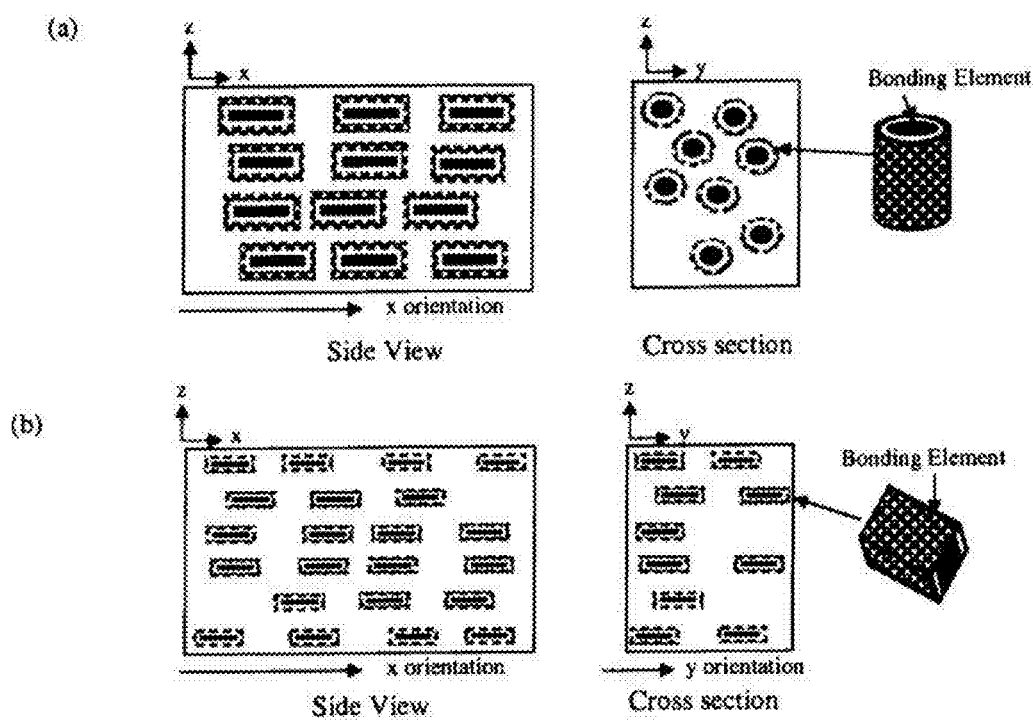
FIGS. 12(a)-12(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.
Figure 12:
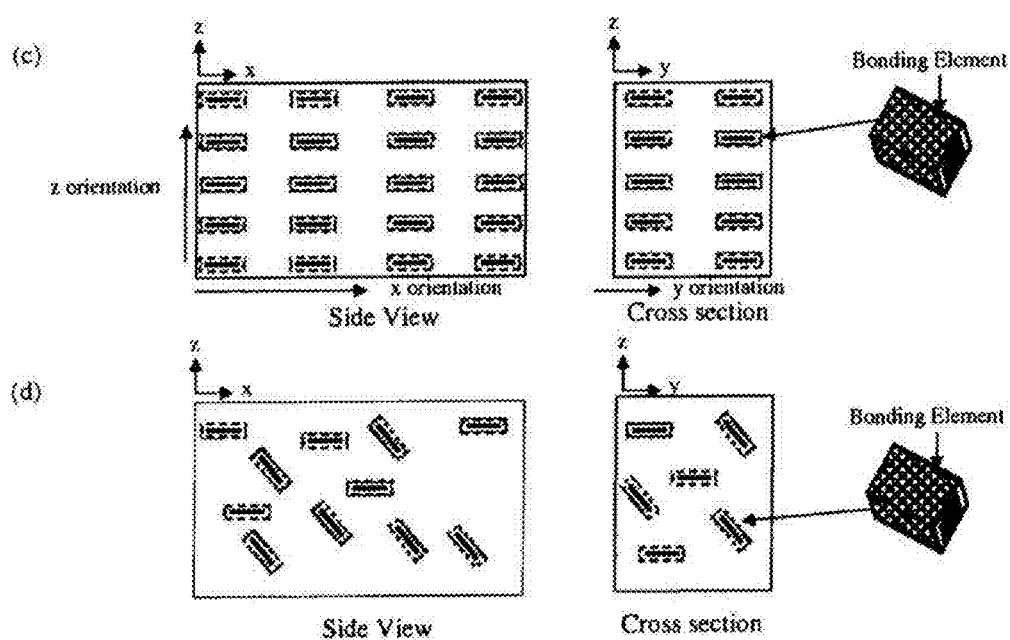
Figure 12:
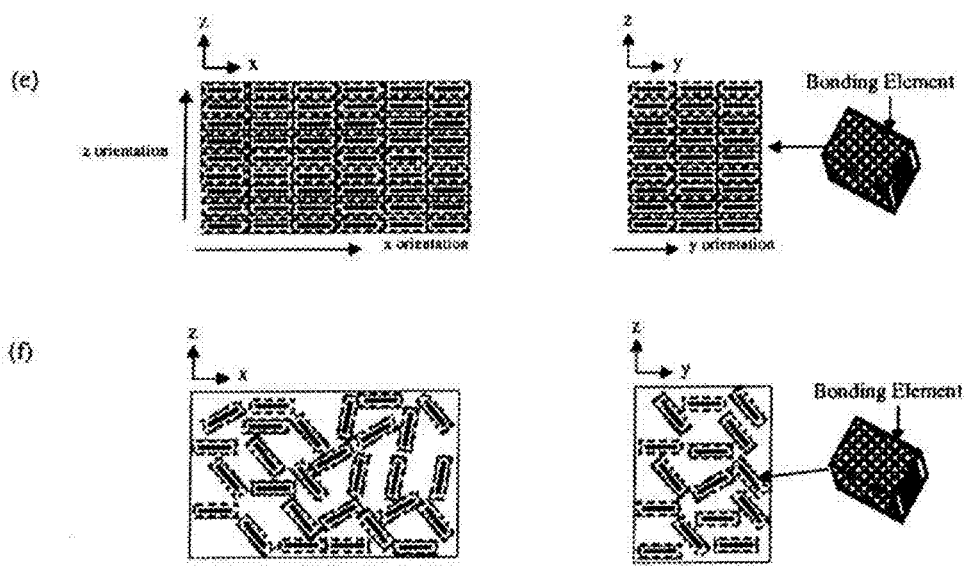

Within the bonding matrix, the bonding elements may be positioned, relative to each other, in any one of a number of orientations. FIGS. 12(a)-12(f) schematically illustrate an exemplary bonding matrix that includes fiber- or platelet-shaped bonding elements in different orientations possibly diluted by the incorporation of filler material, as represented by the spacing between the bonding elements. FIG. 12(a), for example, illustrates a bonding matrix that includes fiber-shaped bonding elements aligned in a one-direction ("1-D") orientation (e.g., aligned with respect to the x direction). FIG. 12(b) illustrates a bonding matrix that includes platelet-shaped bonding elements aligned in a two-direction ("2-D") orientation (e.g., aligned with respect to the x and y directions). FIG. 12(c) illustrates a bonding matrix that includes platelet-shaped bonding elements aligned in a three-direction ("3-D") orientation (e.g., aligned with respect to the x, y and z directions). FIG. 12(d) illustrates a bonding matrix that includes platelet-shaped bonding elements in a random orientation, wherein the bonding elements are not aligned with respect to any particular direction. FIG. 12(e) illustrates a bonding matrix that includes a relatively high concentration of platelet-shaped bonding elements that are aligned in a 3-D orientation. FIG. 12(f) illustrates a bonding matrix that includes a relatively low concentration of platelet-shaped bonding elements that are situated in a random orientation (a percolation network). The composite material of FIG. 12(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 12(e), or random orientation, e.g., FIG. 12(f), of bonding elements. Examples of connectivity patterns can be found in, for example, Newnham, et al., "Connectivity and piezoelectric-pyroelectric composites", *Mat. Res. Bull.* vol. 13, pp. 525-536, 1978).

The plurality of bonding elements may be chemically transformed from any suitable precursor materials, for example, from a precursor calcium silicate other than Wollastonite. The precursor calcium silicate may include one or more chemical elements of aluminum, magnesium and iron.

The plurality of bonding elements may have any suitable median particle size and size distribution dependent on the desired composite material. In certain embodiments, the plurality of bonding elements have a median particle size in the range of about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

In some instances a composite material includes: a plurality of bonding elements and a plurality of filler particles. Each bonding element includes: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties. In some instances, the bonding elements may have a core of magnesium silicate, and a silica-rich first or inner layer, and a magnesium carbonate-rich second or outer layer. The magnesium silicate can include aluminum, calcium, iron or manganese oxides.

The plurality of filler particles may have any suitable median particle size and size distribution. In certain embodiments, the plurality of filler particles has a median particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

In certain preferred embodiments, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

The weight ratio of (bonding elements):(filler particles) may be any suitable rations dependent on the desired composite material, for example, in the range of about (10 to 50):about (50 to 90).

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%,).

EXAMPLES

Example 1: Pervious Cylindrical Samples Made Using Ground Calcium Silicate and Coarse Aggregates, without Using any Fine Aggregates The mixture proportions used for preparing pervious samples without the use of fine aggregates are provided in Table 2.

Raw Materials

Ground Calcium Silicate (SC—C2), Donghai Golden Resources Industries, Donghai, China; ¼" and ⅜" coarse aggregates crushed trap rock from Clayton Block Company, Lakewood, N.J., Glenium 7500 admixture from BASF®, and regular tap water.

TABLE 2

| Mixture Proportions - Pervious Composite Material (50 kg batch size) | | |
|---|---|---|
| Ingredients | Weight % | Amount (kg) |
| Solid Components: | 94.80% | |
| Ground Calcium Silicate (SC-C2) | 18.0% | 8.532 |
| ¼" Aggregates | 41.0% | 19.434 |
| ⅜" Aggregates | 41.0% | 19.434 |
| Liquid Components: | 5.20% | |
| Tap Water | 5.20% | 2.600 |
| Glenium ® 7500 | | 0.026 |

Mixing Procedure
1. Measure and load 19.434 kg of ¼" aggregates (41% by weight of the total mixture constituents as in this example) into the hoist of the Sicoma™ planetary mixer.
2. Measure and load 19.434 kg of ⅜" aggregates (41% by weight of the total mixture constituents as in this example) into the hoist of the Sicoma™ planetary mixer.
3. Mix the combination of these two solid components together in the mixer for 1 minute with the arms of the rotor rotating at 40 RPM.
4. Measure and load half of the total quantity of tap water (2.6% of the liquid component by weight, which is 1.30 kg as in this example) into the mixture of the aggregates (solid components) to create a wet mix.
5. Measure and load 8.532 kg (18% by weight of the total mixture constituents as in this example) of ground calcium silicate (SC—C2) into the hoist of the mixer.
6. Mix the combination of the solid and liquid components added so far in the mixer for 3 minutes while having the rotor arms rotating at 40 RPM.
7. Measure and load the remaining half of the tap water (2.6% of the liquid component by weight, which is 1.3 kg as in this example) into the mixture and continue mixing for another 1 minute at 40 RPM.
8. Measure and load 0.026 kg of Glenium® 7500 admixture (final liquid component) into the mix, which corresponds to a dosage of 3 ml/kg of binder (ground calcium silicate as in this example) and mix for an additional 2 minutes to create the final wet mix.

Casting Procedure
1. Lubricate the inner surfaces of each 4"×8" cylindrical steel mold using WD-40 so as to enable easy removal of the cast specimen during de-molding.
2. Pour the wet mix from the mixer onto a container, and transport the container to a location where the molds are kept.
3. Scoop out the wet mixture from the container and pour it into each mold to approximately $\frac{1}{3}^{rd}$ the height of the mold.
4. Using a standard Proctor Hammer (conforming to ASTM D698) for compaction, apply 20 tamps of the hammer on this layer and repeat this procedure for the remaining two $\frac{1}{3}^{rd}$ layers of the wet mixture.
5. Add a final layer of the wet mix to an overflowing height (of the cylinder) and smoothen the top surface using a strike-off plate.
6. Keep the mold at room temperature (23±3° C.) for at least 4 hours before de-molding the green composite ceramic body.

Curing Procedure

The green composite ceramic body (cylinder of pervious composite material) is then placed inside a 7 ft. diameter by 12 ft. long, horizontal, curing chamber. The curing chamber is purged with $CO_2$ gas at atmospheric pressure (0.1 psig) for 12 minutes. The temperature of the curing chamber is then set to 60° C. and the chamber is purged with $CO_2$ gas saturated with water vapor. The specimen inside the curing chamber is then cured or reacted under these conditions for 20 hours leading to the creation of a hardened or cured ceramic body.

The cured ceramic bodies are then removed from the curing chamber and placed in a drying oven set at 90° C. to remove any residual water. The extent of the reaction (or reaction completion) is then calculated based on the weight gain of the ceramic body during the reaction. For the ceramic bodies prepared using the mixture proportions mentioned in Table 3, the extent of reaction was approximately 35% to approximately 60%.

Figure 13:
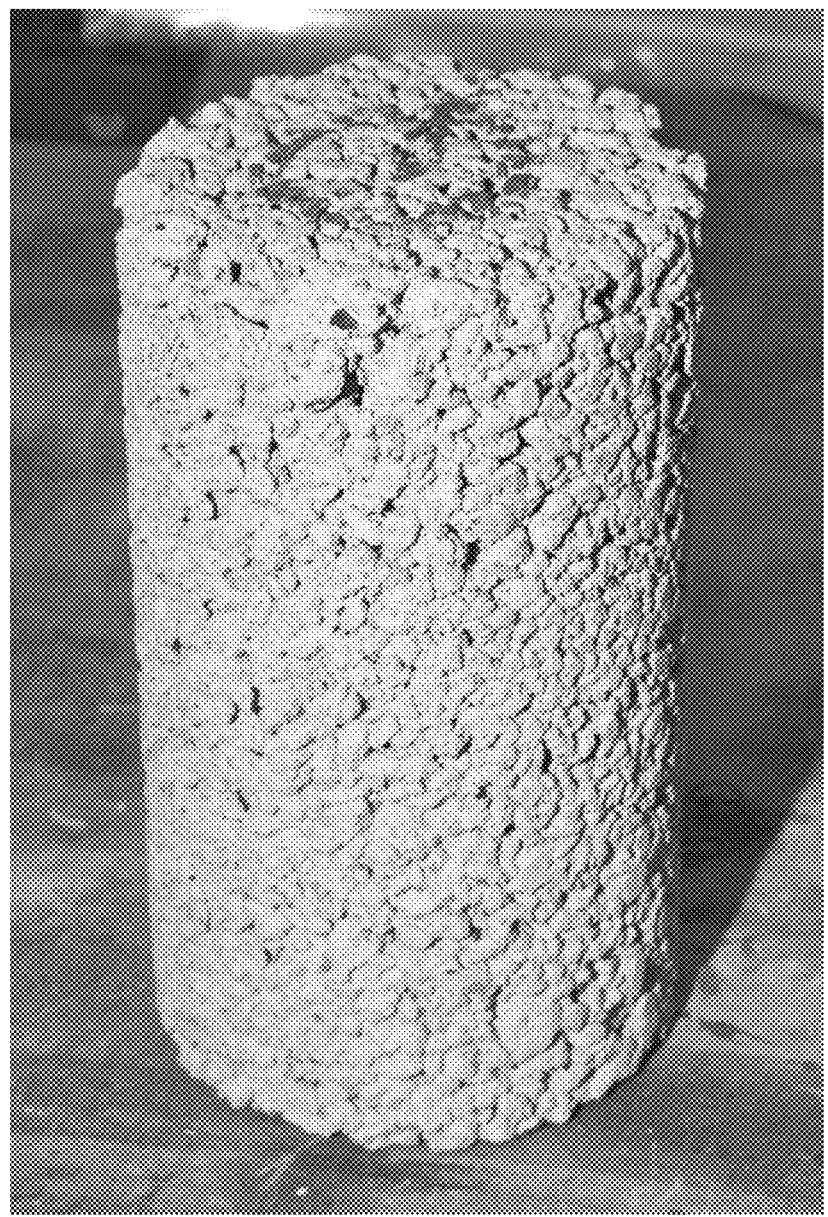
FIG. 13 shows an exemplary cylindrical sample of pervious composite material, made using ground calcium silicate and coarse aggregate, without the use of fine aggregates.

FIG. 13 shows an example of a pervious composite material cast and cured in the manner described in this example.

Testing and Properties

Density and Porosity:

The pore volume (or porosity) of the final wet mix of the pervious composite material was determined using ASTM C1688/C1688M. The pore volume and dry density of the cured pervious composite material cylindrical samples were measured after the samples were oven dried for a period of 24 hours. The pore volume of both the final wet mix and the cured pervious composite material samples were between 20% and 30%. The dry densities of the cured pervious composite material samples were found to be approximately 1800 kg/m³ (112 lbs/ft³) with a standard deviation of approximately 50 kg/m³ (3.1 lbs/ft³).

Compressive Strength:

Compressive strengths of the cured pervious composite material samples with reaction completion between 35% and 45% were measured according to ASTM C39 using a Gilson® universal testing machine at an average loading rate 35±7 psi/sec. The average compressive strength of the samples was found to be 1000 psi (6.90 MPa) with a standard deviation of 75 psi (0.5 MPa).

Flexural Strength:

The flexural strength of the cured pervious composite material specimens can be measured according to ASTM C-67. For this measurement, a 150 kN Instron® mechanical tester equipped with a 3-point flexural strength rig at a strain rate of 0.5 mm/min is preferred. The ratio of flexural strengths to compressive strength usually varies from 0.10 to 0.20.

Permeability:

The permeability or the hydraulic conductivity of the pervious composite material samples is directly related to its porosity and pore sizes. For the specimens prepared using these mixture proportions, the permeability is expected to be approximately 0.01 m/s.

Example 2: Pervious Composite Material Cylindrical Samples Made Using Ground Calcium Silicate, Single-Sized Coarse Aggregate and a Small Proportion of Fine Aggregates The mixture proportions used for preparing pervious composite material samples using ground calcium silicate, single size aggregate (¼") and with the use of a small proportion (5% by weight of the total solid constituents) of fine aggregates consisting of construction sand are provided in Table 3.

Raw Materials

Ground Calcium Silicate (SC—C2), Donghai Golden Resources Industries, Donghai, China; ¼" size aggregates crushed trap rock from Clayton Block Company, Lakewood, N.J.; Sieved construction sand, Stavola Construction Materials, Bound Brook, N.J.; Glenium 7500 admixture from BASF®, and regular tap water.

TABLE 3

Mixture Proportions - Pervious Composite Material with 5% sand (21 kg batch size)

| Ingredients | Weight % | Amount (kg) |
|---|---|---|
| Solid Components: | 93.50% | |
| Ground Calcium Silicate (SC-C2) | 18.70% | 3.927 |
| ¼" Aggregates | 70.125% | 14.726 |
| Construction Sand | 4.675% | 0.982 |
| Liquid Components: | 6.50% | |
| Tap Water | 6.50% | 1.365 |
| Glenium ® 7500 | | 0.012 |

Mixing Procedure

1. Measure and load 14.726 kg of ¼" aggregates (70.125% by weight of the total mixture constituents as in this example) into the hoist of the Sicoma™ planetary mixer.
2. Measure and load half of the total quantity of tap water (3.25% of the liquid component by weight, which is 0.6825 kg as in this example) into the mixer and mix for 1 minute at 40 RPM to create a wet mix.
3. Measure and load 3.927 kg of ground calcium silicate (18.70% by weight of the total mixture constituents as in this example) into the hoist of the Sicoma™ planetary mixer and continue mixing for 1 minute at 40 RPM.
4. Measure and load 0.982 kg of Construction Sand (4.675% by weight of the total mixture constituents as in this example) into the hoist of the Sicoma™ planetary mixer and continue mixing for 1 minute at 40 RPM.
5. Measure and load the remaining half of the tap water into the mixture and continue mixing for another 1 minute at 40 RPM.
6. Measure and load 0.012 kg of Glenium® 7500 admixture (final liquid component) into the mix, which corresponds to a dosage of 3 ml/kg of binder (ground calcium silicate as in this example) and mix for an additional 1 minute to create the final wet mix.

Casting Procedure

The casting procedure for preparing this pervious composite material mixture is similar to the one explained in the Example 1.

Curing Procedure

The curing procedure for preparing this pervious composite material mixture is similar to the one explained in the Example 1.

Properties and Testing

Density and Porosity:

The pore volume (or porosity) of the final wet mix of the pervious composite material was determined using ASTM C1688/C1688M. The pore volume and dry density of the cured pervious composite material cylindrical samples were measured after the samples were oven dried for a period of 24 hours. The pore volume of both the final wet mix and the cured pervious composite material samples were between 15% and 30%. The dry densities of the cured pervious composite material samples were found to be approximately 1900 kg/m³ (118 lbs/ft³) with a standard deviation of approximately 50 kg/m³ (3.1 lbs/ft³).

Compressive Strength:

Compressive strengths of the cured pervious composite material samples with reaction completion between 30% and 40% were measured according to ASTM C39 using a Gilson® universal testing machine at an average loading rate 35±7 psi/sec. The average compressive strength of the samples was found to be 1150 psi (7.93 MPa) with a standard deviation of 150 psi (1.1 MPa).

Flexural Strength:

The flexural strength of the cured pervious composite material specimens can be measured according to ASTM C-67. For this measurement, a 150 kN Instron® mechanical tester equipped with a 3-point flexural strength rig at a strain rate of 0.5 mm/min is preferred. The ratio of flexural strengths to compressive strength usually varies from 0.10 to 0.20.

Permeability:

The permeability or the hydraulic conductivity of the pervious composite material samples is directly related to its porosity and pore sizes. For the specimens prepared using these mixture proportions, the permeability is expected to be approximately 0.01 m/s.

Example 3: Pervious Composite Material Pavement Slab Made Using Ground Calcium Silicate and Coarse Aggregates without Using any Fine Aggregates The mixture proportions used for preparing the pervious composite material pavement slab without the use of fine aggregates in the mix are provided in Table 4.

Raw Materials

Ground Calcium Silicate (SC—C2), Donghai Golden Resources Industries, Donghai, China; ¼" and ⅜" coarse aggregates crushed trap rock from Clayton Block Company, Lakewood, N.J., Glenium 7500 admixture from BASF®, and regular tap water.

TABLE 4

Mixture Proportions - Pervious Composite Material (550 kg batch size)

| Ingredients | Weight % | Amount (kg) |
| --- | --- | --- |
| Solid Components: | 94.80% | |
| Ground Calcium Silicate (SC-C2) | 18.0% | 93.852 |
| ¼" Aggregates | 41.0% | 213.774 |
| ⅜" Aggregates | 41.0% | 213/774 |
| Liquid Components: | 5.20% | |
| Tap Water | 5.20% | 28.600 |
| Glenium ® 7500 | | 0.282 |

Mixing Procedure
1. Measure and load 213.774 kg of ¼" aggregates (41% by weight of the total mixture constituents as in this example) into the hoist of the Sicoma™ planetary mixer.
2. Measure and load 213.774 kg of ⅜" aggregates (41% by weight of the total mixture constituents as in this example) into the hoist of the Sicoma™ planetary mixer.
3. Mix the combination of these two solid components together in the mixer for 1 minute with the arms of the rotor rotating at 40 RPM.
4. Measure and load half of the total quantity of tap water (2.6% of the liquid component by weight, which is 14.30 kg as in this example) into the mixture of the aggregates (solid components) to create a wet mix.
5. Measure and load 93.852 kg (18% by weight of the total mixture constituents as in this example) of ground calcium silicate (SC—C2) into the hoist of the mixer.
6. Mix the combination of the solid and liquid components added so far in the mixer for 3 minutes while having the rotor arms rotating at 40 RPM.
7. Measure and load the remaining half of the tap water (2.6% of the liquid component by weight, which is 14.30 kg as in this example) into the mixture and continue mixing for another 1 minute at 40 RPM.
8. Measure and load 0.282 kg of Glenium® 7500 admixture (final liquid component) into the mix, which corresponds to a dosage of 3 ml/kg of binder (ground calcium silicate as in this example) and mix for an additional 2 minutes to create the final wet mix.

Figure 14:
FIG. 14 shows an exemplary mold used for preparing a pervious composite material in the form of a slab. A thin (~0.50 in) layer of construction sand acting as a base material to absorb and retain moisture is also shown.
Figure 15:
FIG. 15 shows a fresh wet mixture being poured onto a wooden mold.
Figure 16:
FIG. 16 shows exemplary compaction of pervious composite pavement slab mix using a flat head compactor.
Figure 17:
FIG. 17 shows an exemplary sealed wooden mold with compacted pervious mix.

Casting Procedure
1. A wooden mold having a cross-section of 4 ft. by 4 ft. and a height of 10 inches was fabricated as shown in FIG. 14. Care was taken to ensure that the inner surfaces were completely sealed with plastic sheet and tapes. A hole (~0.5 inch diameter) was drilled on two opposite ends of the wooden molds for $CO_2$ inflow and outflow.
2. The wet mix from the mixer was poured onto a container, which was transported to the location where the wooden mold was placed, and then transferred onto the mold as shown in FIG. 15. This process of transferring the wet mix from the container to the mold took place in three pours (each pour of $\frac{1}{3}^{rd}$ the height of the mold).
3. Compaction of each layer was then carried out using a flat-head soil or clay compactor (as shown in FIG. 16) and this step was repeated for the remaining two $\frac{1}{3}^{rd}$ layers of the pour.
4. After the final layer was compacted, the top surface of the wooden mold was sealed completely using a plastic sheet as shown in FIG. 17. The figure also shows a device placed near the outflow point which detects the $CO_2$ concentration.

Curing Procedure

Figure 18:
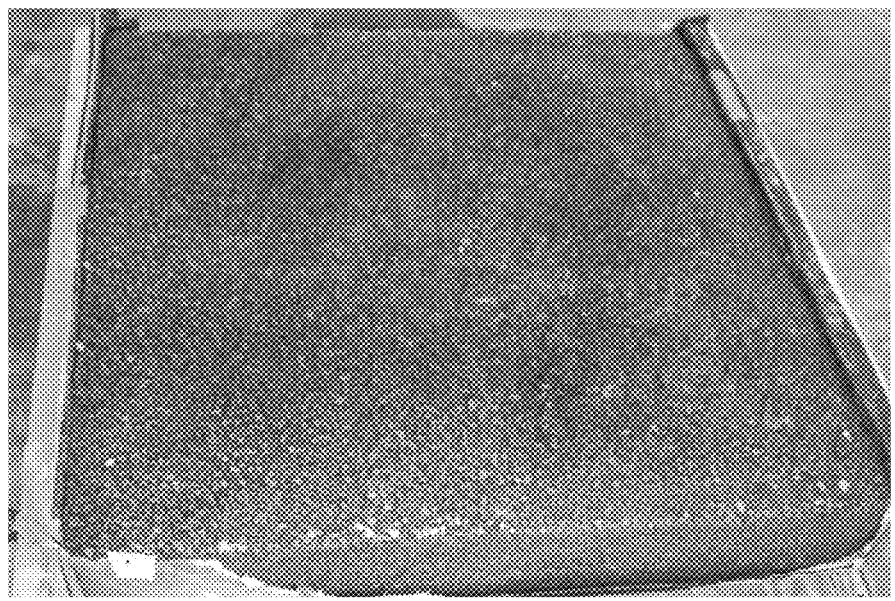
FIG. 18 shows an exemplary pervious composite slab after curing.

The curing of the pervious composite material slab was carried out at room temperature (23±3° C.) using the $CO_2$ supplied through the inlet point on one side of the wooden mold. The $CO_2$ flow was maintained for a period of 20 hours at a pressure of 0.3 psig. At the end of the curing period, the $CO_2$ flow was stopped, the seal provided by the plastic sheet was removed, and the slab was de-molded from the wooden mold. FIG. 18 shows the example of the pervious composite material slab after it has been cured. Samples for subsequent testing were core-drilled from the cured slab. These samples were in the form of cylinders, 4-inches in diameter and approximately 8-inches tall.

Properties and Testing

Density and Porosity:

The pore volume (or porosity) of the final wet mix of the pervious composite material was determined using ASTM C1688/C1688M. The pore volume and dry density of the cured pervious composite material cylindrical samples were measured after the samples were oven dried for a period of 24 hours. The pore volume of both the final wet mix and the cured pervious composite material samples were between 15% and 30%. The dry densities of the cured pervious composite material samples were found to be approximately 1900 kg/m³ (118 lbs/ft³) with a standard deviation of approximately 50 kg/m³ (3.1 lbs/ft³).

Compressive Strength:

Compressive strengths of the cured pervious composite material samples with reaction completion between 30% and 40% were measured according to ASTM C39 using a Gilson® universal testing machine at an average loading rate 35±7 psi/sec. The average compressive strength of the samples was found to be 1100 psi (7.58 MPa) with a standard deviation of 150 psi (1.1 MPa).

Flexural Strength:

The flexural strength of the cured pervious composite material specimens can be measured according to ASTM C-67. For this measurement, a 150 kN Instron® mechanical tester equipped with a 3-point flexural strength rig at a strain rate of 0.5 mm/min is preferred. The ratio of flexural strengths to compressive strength usually varies from 0.10 to 0.20.

Permeability:

The permeability or the hydraulic conductivity of the pervious composite material samples is directly related to its porosity and pore sizes. For the specimens prepared using these mixture proportions, the permeability is expected to be approximately 0.01 m/s.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A pervious composite material comprising:
   a plurality of bonding elements, wherein each bonding element comprises:
      a core comprising primarily calcium silicate,
      a silica-rich first or inner layer, and
      a calcium carbonate-rich second or outer layer;
   a plurality of aggregates having sizes of about 0.25 mm to about 25 mm, wherein the aggregates comprise a first group of particle aggregates of a size about ⅛" to about ¼" and a second group of particle aggregates of a size about ⅜" to about ½"; and
   a plurality of pores having sizes from about 0.1 mm to about 10 mm, wherein
   the plurality of bonding elements and the plurality of aggregates together form one or more bonding matrices and the bonding elements and aggregates are substantially evenly dispersed therein and bonded together; and
   the plurality of pores account for from about 5 vol. % to about 40 vol. % of the pervious composite material and form interconnected channels allowing the composite material to be water permeable; and,
   whereby
   the pervious composite material exhibits a density from about 1,500 kg/m$^3$ to 2,200 kg/m$^3$, a compressive strength from about 3.0 MPa to about 30 MPa, a flexural strength from about 1.0 MPa to about 4.0 MPa, and a hydraulic conductivity from about 100 cm/hr to about 8,000 cm/hr,
   wherein the aggregates account for about 50 wt. % to about 85 wt. % of the pervious composite material.

2. The pervious composite material of claim 1, wherein the plurality of bonding elements have a median particle size in the range from about 5 μm to about 100 μm.

3. The pervious composite material of claim 1, wherein the aggregates comprise a material selected from crushed trap rock, sand, perlite or vermiculite and pea-gravel.

4. The pervious composite material of claim 1, wherein the plurality of bonding elements is chemically transformed from ground calcium silicate and the coarse aggregates are crushed trap rock.

5. The pervious composite material of claim 1, wherein the aggregates account for about 70 wt. % to about 80 wt. % of the pervious composite material.

6. The pervious composite material of claim 1, wherein the plurality of bonding elements are chemically transformed from a precursor calcium silicate other than ground calcium silicate.

7. The pervious composite material of claim 1, wherein the plurality of bonding elements are chemically transformed from a precursor calcium silicate comprising one or more of aluminum, magnesium and iron.

8. The pervious composite material of claim 1, wherein the plurality of pores account for from about 10 vol. % to about 40 vol. % of the pervious composite material.

9. The pervious composite material of claim 8, wherein the plurality of voids account for from about 15 vol. % to about 30 vol. % of the pervious composite material.

10. The pervious composite material of claim 1, wherein the plurality of bonding elements are prepared by chemical transformation from ground calcium silicate by reacting it with $CO_2$ via a controlled hydrothermal liquid phase sintering process.

11. The pervious composite material of claim 1, wherein the plurality of bonding elements are prepared by chemical transformation from the precursor calcium silicate other than ground calcium silicate by reacting it with $CO_2$ via a controlled hydrothermal liquid phase sintering process.

12. The pervious composite material of claim 1, exhibiting a density from about 1,600 kg/m$^3$ to 2,200 kg/m$^3$, a compressive strength from about 4.0 MPa to about 30 MPa, a flexural strength from about 1.0 MPa to about 4.0 MPa, and a hydraulic conductivity from about 100 cm/hr to about 6,000 cm/hr.

13. The pervious composite material of claim 12, exhibiting a density from about 1700 kg/m$^3$ to 2100 kg/m$^3$, a compressive strength from about 6.0 MPa to about 24 MPa, a flexural strength from about 2.0 MPa to about 4.0 MPa, and a hydraulic conductivity from about 100 cm/hr to about 5000 cm/hr.

14. The pervious composite material of claim 1, further comprising one or more additives to modify the appearance, physical or mechanical properties of the product.

15. The pervious composite material of claim 14, wherein the one or more additives are selected from plasticizers, retarders, accelerators, and dispersants.

16. The pervious composite material of claim 15, wherein the one or more additives account for less than about 0.5 wt. % of the pervious composite material.

17. The pervious composite material of claim 1, further comprising one or more pigments.

18. The pervious composite material of claim 1, wherein the pigment comprises one or more of black iron oxide, cobalt oxide and chromium oxide.

19. The pervious composite material of claim 1, further comprising one or more of silica fume, fly ash and blast furnace slag, cement-kiln dust, and crusher dust.

20. An article of manufacture made from the pervious composite material of claim 1.

21. The article of manufacture of claim 20, selected from the group consisting of pavements, driveways, parking lots, sidewalks, pathways, tennis courts, well linings, patios, swimming pool decks, noise barriers, and walls.

\* \* \* \* \*